(12) United States Patent
Wu (10) Patent No.: US 11,368,905 B2
(45) Date of Patent: Jun. 21, 2022

(54) DEVICE AND METHOD OF HANDLING A CONNECTION IN A WIRELESS COMMUNICATION SYSTEM (71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 15/890,366

(22) Filed: Feb. 7, 2018

(65) Prior Publication Data
US 2018/0227843 A1 Aug. 9, 2018

Related U.S. Application Data (60) Provisional application No. 62/555,657, filed on Sep. 8, 2017, provisional application No. 62/456,611, filed on Feb. 8, 2017.

(51) Int. Cl.
*H04W 48/18* (2009.01)
*H04W 76/20* (2018.01)
(Continued)

(52) U.S. Cl.
CPC .......... *H04W 48/18* (2013.01); *H04L 12/14* (2013.01); *H04M 15/57* (2013.01); *H04W 4/24* (2013.01); *H04W 36/14* (2013.01); *H04W 76/20* (2018.02); *H04W 36/0016* (2013.01); *H04W 36/38* (2013.01); *H04W 48/16* (2013.01);
(Continued)

(58) Field of Classification Search
CPC ......... H04W 36/0016; H04W 36/0022; H04W 36/14; H04W 36/0011; H04W 36/08; H04W 36/38; H04W 48/16; H04W 48/18; H04W 76/10; H04W 76/20; H04W 76/50; H04W 80/04; H04W 88/06; H04W 4/24; H04W 76/18; H04W 76/30; H04L 65/1016; H04L 12/14; H04M 15/57
See application file for complete search history.

(56) References Cited

U.S. PATENT DOCUMENTS 8,805,319 B2    8/2014  Daly
2016/0014667 A1* 1/2016 Sirotkin ................. H04W 4/70
                                                    370/252
(Continued)

FOREIGN PATENT DOCUMENTS

CN    102088747 A    6/2011
CN    102893673 A    1/2013
(Continued)

OTHER PUBLICATIONS

Search Report dated Jul. 2, 2018 for EP application No. 18155627.5, pp. 1-9.

(Continued)

Primary Examiner — Quoc Thai N Vu
(74) Attorney, Agent, or Firm — Winston Hsu (57) ABSTRACT A communication device of handling connection comprises a storage device for storing an instruction and a processing circuit coupled to the storage device. The processing circuit is configured to execute the instructions stored in the storage device. The instruction comprises prioritizing selecting a long term evolution (LTE) network over a new radio (NR) network, when the communication device is configured to enable a voice service.

14 Claims, 4 Drawing Sheets (51) Int. Cl.
  H04L 12/14     (2006.01)
  H04W 36/14    (2009.01)
  H04W 4/24     (2018.01)
  H04M 15/00    (2006.01)
  H04W 80/04    (2009.01)
  H04W 36/00    (2009.01)
  H04W 76/30    (2018.01)
  H04W 48/16    (2009.01)
  H04W 88/06    (2009.01)
  H04W 36/38    (2009.01)
  H04W 76/10    (2018.01)
  H04W 76/18    (2018.01)

(52) U.S. Cl.
  CPC ............ H04W 76/10 (2018.02); H04W 76/18 (2018.02); H04W 76/30 (2018.02); H04W 80/04 (2013.01); H04W 88/06 (2013.01)

(56) References Cited

U.S. PATENT DOCUMENTS

| | | | |
|---|---|---|---|
| 2016/0262068 A1 | 9/2016 | Won | |
| 2016/0295629 A1 | 10/2016 | Gubeskys | |
| 2016/0295631 A1 | 10/2016 | Gubeskys | |
| 2017/0086119 A1 | 3/2017 | Xu | |
| 2018/0041909 A1 | 2/2018 | Fukui | |
| 2018/0084468 A1* | 3/2018 | Carames | H04W 36/08 |
| 2018/0132141 A1* | 5/2018 | Huang-Fu | H04L 65/1063 |
| 2018/0192347 A1* | 7/2018 | Shaheen | H04W 36/36 |
| 2019/0058997 A1* | 2/2019 | Futaki | H04W 36/26 |
| 2019/0349765 A1* | 11/2019 | Kolekar | H04W 12/069 |
| 2020/0059989 A1* | 2/2020 | Velev | H04W 36/12 |

FOREIGN PATENT DOCUMENTS

| | | | |
|---|---|---|---|
| CN | 105873241 A | 8/2016 | |
| GB | 2547726 A | 8/2017 | |
| WO | 2016/050990 A1 | 4/2016 | |
| WO | 2016/147602 A1 | 9/2016 | |

OTHER PUBLICATIONS

Huawei, HiSilicon, "Network selection and NAS routing for eLTE", 3GPP TSG-RAN WG2 Meeting AH, R2-1700307, Jan. 17-19, 2017, Spokane, US, XP051210888, pp. 1-3.
Huawei, HiSilicon, "Network selection for initial access in eLTE network", 3GPP TSG-RAN WG2 #97, R2-1701853, Feb. 13-17, 2017, Athens, Greece, XP051223743, pp. 1-3.
ZTE Corporation, Sane Chips, "Consideration on mobility for E-UTRA connected to 5GC", 3GPP TSG-RAN WG2 Meeting#99bis, R2-1710421, Oct. 9-13, 2017, Prague, Czech, XP051342466, pp. 1-4.
Ericsson, "New RAN Roll Out Scenarios", 3GPP TSG-RAN WG3 Meeting #93, R3-161895, Aug. 22-26, 2016, Göteborg, Sweden, XP051127704, pp. 1-5.
OPPO, "Clarification on eNB id is unchanged during HO", SA WG2 Meeting #124, S2-178437, Nov. 27-Dec. 1, 2017, Reno, Nevada, USA, XP051379450, pp. 1-6.
3GPP TS 23.501 V0.2.0, Jan. 2017.
3GPP TS 23.502 V0.4.0, May 2017.
Huawei, HiSilicon, "Necessary RRC functions for NR and evolved LTE", 3GPP TSG-RAN WG2 Meeting #95bis, R2-166514, Kaohsiung, Oct. 10-14, 2016.
Office action dated Oct. 5, 2018 for the Taiwan application No. 107104410, filing date Feb. 8, 2018, pp. 1-18.
Office action dated Mar. 13, 2019 for EP application No. 18155627.5, pp. 1-7.
LG Electronics, "Update of solution 18.3: Solutions for migration from E-UTRAN/EPC including option 3 to option 2,4,5, or 7", SA WG2 Meeting #118, S2-166555, Nov. 14-18, 2016, Reno, Nevada, USA, XP051185114, pp. 1-5.
Icaro Da Silva et al., "Tight Integration of New 5G Air Interface and LTE to Fulfill 5G Requirements", 2015, pp. 1-5, 2015 IEEE, XP033167639.
Search Report dated Mar. 14, 2019 for EP application No. 19155385.8, pp. 1-7.
Nokia, Alcatel-Lucent Shanghai Bell, "TS 23.501: Voice and emergency session support for 5G.", SA WG2 Meeting #121, S2-173417, May 15-19, 2017, Hangzhou, China, XP051281909, pp. 1-3.
Intel, Samsung, "EPS fallback", SA WG2 Meeting #122, S2-174552, Jun. 26-30, 2017, San Jose Del Cabo, Mexico, XP051303398, pp. 1-2.
NTT DOCOMO, "Multimedia calls fallback from NextGen system to EPS", SA WG2 Meeting #117, S2-165848, Oct. 17-21, 2016, Kaohsiung city, Taiwan, XP051155429, pp. 1-4.
Qualcomm Incorporated, "Updates on interworking and migration solution 18.2", SA WG2 Meeting #116bis, S2-164641, Aug. 29-Sep. 2, 2016, Sanya, P.R. China, XP051130596, pp. 1-7.
3GPP TR 23.799 V14.0.0 (Dec. 2016), "3rd Generation Partnership Project; Technical Specification Group Services and System Aspects; Study on Architecture for Next Generation System (Release 14)", XP051295448, pp. 1-522.
LG Electronics, "Interworking options for supporting or non-supporting NGx", SA WG2 Meeting #118-BIS, S2-17203, Jan. 16-20, 2017, Spokane, WA, USA, XP051216392, pp. 1-3.
"The need for additional broadcast capacity", 3GPP Draft; RP-131801 Motivation Slides for BCH WID V2, 3rd Generation Partnership Project (3GPP), Mobile Competence Centre; 650, Route Des Lucioles; F-06921 Sophia-Antipolis Cedex; France, Dec. 2, 2013, XP050733980, pp. 1-5.
Office action dated May 13, 2020 for the China application No. 201810128435.2, filing date Feb. 8, 2018, p. 1-9.
Intel, "Way forward on NGC-EPC interworking", SA WG2 Meeting #118, S2-166623, Nov. 14-18, 2016, Reno, Nevada, USA, XP051185181, pp. 1-4.
Nokia, "IMS for 5G, Principles to be adopted, TS 23.501", SA WG2 Meeting #119, S2-171178, Feb. 13-17, 2017, Dubrovnik, Croatia, XP051228434, pp. 1-4.
Huawei, "Solution for single radio based lightweight interworking and migration", SA WG2 Meeting #117, S2-165657, Oct. 17-21, 2016, Kaohsiung, Taiwan, XP051155243, pp. 1-4.
MediaTek Inc., "RAT/EPS Fallback for IMS Multimedia calls", SAWG2 Meeting #118, S2-166581, Nov. 14-18, 2016, Reno, Nevada, USA, XP051185140, pp. 1-8.
3GPP TS 23.221 V14.1.0 (Dec. 2016), "3rd Generation Partnership Project; Technical Specification Group Services and System Aspects; Architectural requirements (Release 14)", XP051295440, pp. 1-52, Dec. 2016.
Office action dated Feb. 25, 2021 for EP application No. 18155627.5, pp. 1-13.
3rd Generation Partnership Project; Technical Specification Group Services and System Aspects; Study on Architecture for Next Generation System (Release 14), 3GPP TR 23.799 V1.0.2 (Sep. 2016), Technical Report, pp. 1-35, Sep. 2016.
Office action dated Jan. 14, 2021 for the China application No. 201810128435.2, filing date Feb. 8, 2018, pp. 1-11.

* cited by examiner

DEVICE AND METHOD OF HANDLING A CONNECTION IN A WIRELESS COMMUNICATION SYSTEM

CROSS REFERENCE TO RELATED APPLICATIONS

This application claims the benefits of U.S. Provisional Applications No. 62/456,611, filed on Feb. 8, 2017, and No. 62/555,657, filed on Sep. 8, 2017, which are incorporated herein by reference.

BACKGROUND OF THE INVENTION

1. Field of the Invention

The present invention relates to a communication device and a method used in a wireless communication system, and more particularly, to a communication device and method of handling connection in a wireless communication system.

2. Description of the Prior Art

A user equipment (UE) may connect to one of a long term evolution (LTE) network and a new radio (NR) network. However, it is unknown which one of the LTE network and the NR network should be connected. Accordingly, a wrong connection between the UE and the LTE network or the NR network may be established. Thus, how to handle the connection between the UE and the LTE network or the NR network is an important problem to be solved.

SUMMARY OF THE INVENTION

The present invention therefore provides a communication device and method for handling connection to solve the abovementioned problem.

A communication device of handling connection comprises a storage device for storing an instruction and a processing circuit coupled to the storage device. The processing circuit is configured to execute the instructions stored in the storage device. The instruction comprises prioritizing selecting a long term evolution (LTE) network over a new radio (NR) network, when the communication device is configured to enable a voice service.

A new radio (NR) network of handling connection comprises a storage device for storing instructions and a processing circuit coupled to the storage device. The processing circuit is configured to execute the instructions stored in the storage device. The instructions comprise receiving a first message from a first communication device; and transmitting a radio resource control (RRC) message redirecting the first communication device to a long term evolution (LTE) network to the first communication device, when the first message is for initiating a first internet protocol (IP) multimedia subsystem (IMS) service.

A communication device of handling connection comprises a storage device for storing instructions and a processing circuit coupled to the storage device. The processing circuit is configured to execute the instructions stored in the storage device. The instructions comprise transmitting a first message to a new radio (NR) network, wherein the first message is for initiating a first internet protocol (IP) multimedia subsystem (IMS) service; receiving a radio resource control (RRC) message redirecting the communication device to a long term evolution (LTE) network from the NR network, wherein the RRC message is for responding to the first message; connecting to the LTE network according to the RRC message; and transmitting at least one IMS service packet to the LTE network, after connecting to the LTE network.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
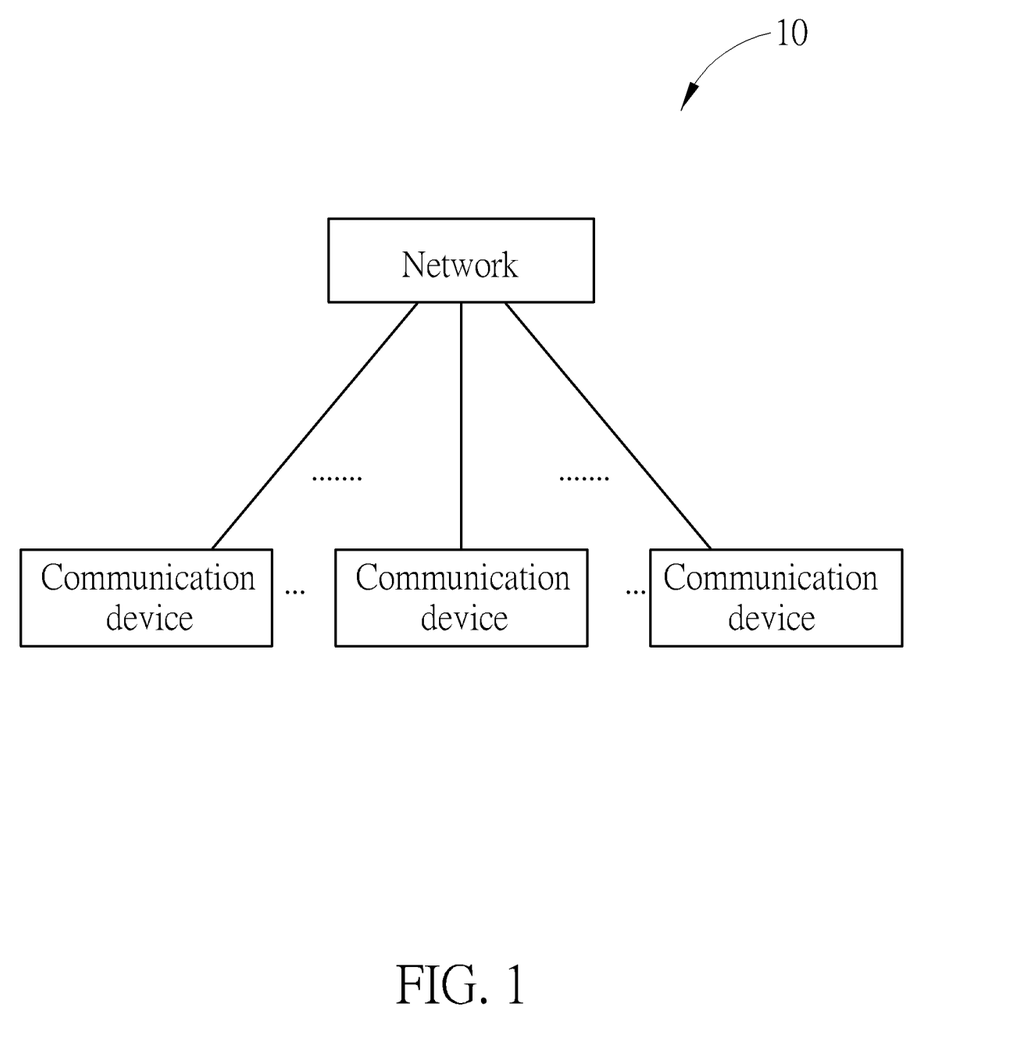
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. Practically, the network may include at least one of a long term evolution (LTE) network and a new radio (NR) network (or called fifth generation (5G) system (5GS)). The LTE network may be an evolved universal terrestrial radio access network (E-UTRAN) including at least one evolved Node-B (eNB), which may connect to an evolved packet core (EPC) of the LTE network. The NR network may be a 5G radio access network including at least one 5G BS (e.g., gNB), which may connect to a next generation (NG) core (NGC) (or called 5G core network (5GC)) of the NR network. In general, a BS may also be used to refer to any of the eNB and the 5G BS.

A communication device may be a user equipment (UE), a mobile phone, a laptop, a tablet computer, an electronic book, a portable computer system, a vehicle, a ship or an aircraft. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
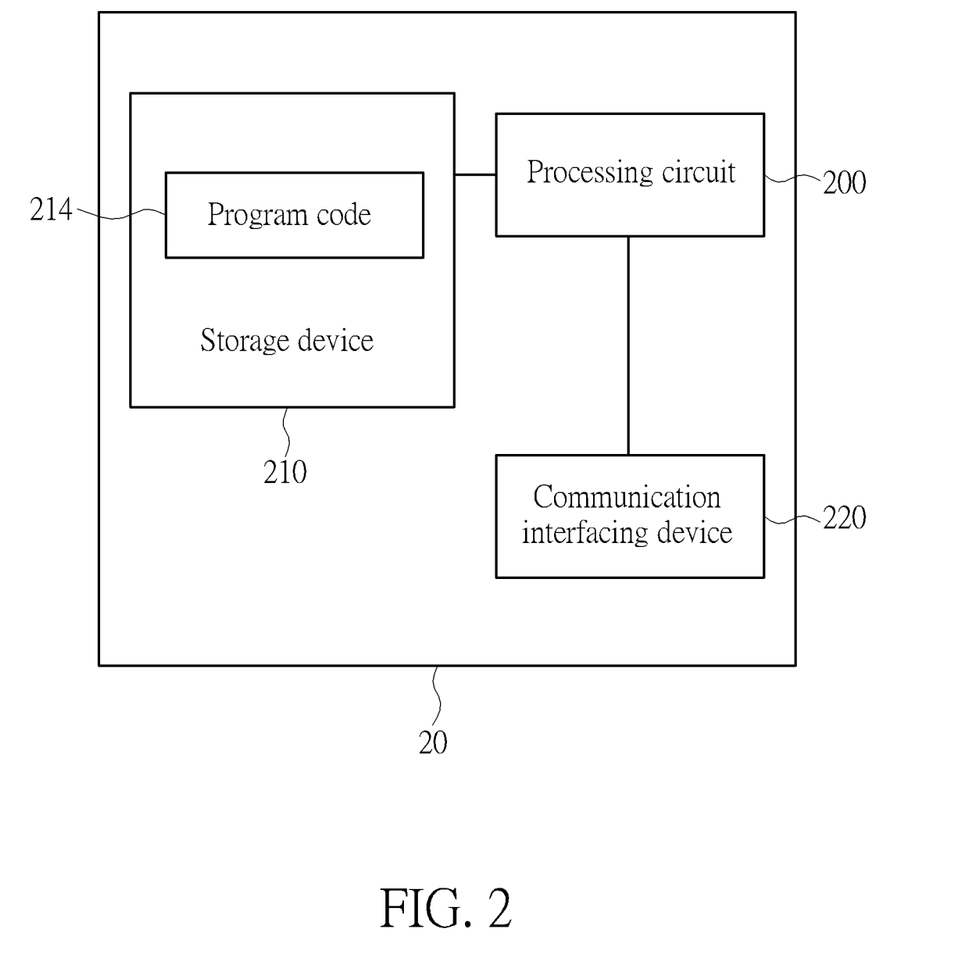
FIG. 2 is a schematic diagram of a communication device according to an example of the present invention.

FIG. 2 is a schematic diagram of a communication device 20 according to an example of the present invention. The communication device 20 may be the communication device shown in FIG. 1, but is not limited herein. The communication device 20 may include at least one processing circuit 200 such as at least one microprocessor or Application Specific Integrated Circuit (ASIC), at least one storage device 210 and at least one communication interfacing device 220. The at least one storage device 210 may be any data storage device that may store program codes 214, accessed and executed by the at least one processing circuit 200. Examples of the at least one storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The at least one communication interfacing device 220 includes at least one transceiver used to transmit and receive signals (e.g., data, messages and/or packets) according to processing results of the at least one processing circuit 200. The BS may belong to (e.g., is managed/controlled by) the network to perform steps or instructions for realizing the following examples.

In the following examples, a UE/a first UE/a second UE is used for representing the communication device in FIG. 1, to simplify the illustration of the examples.

Figure 3:
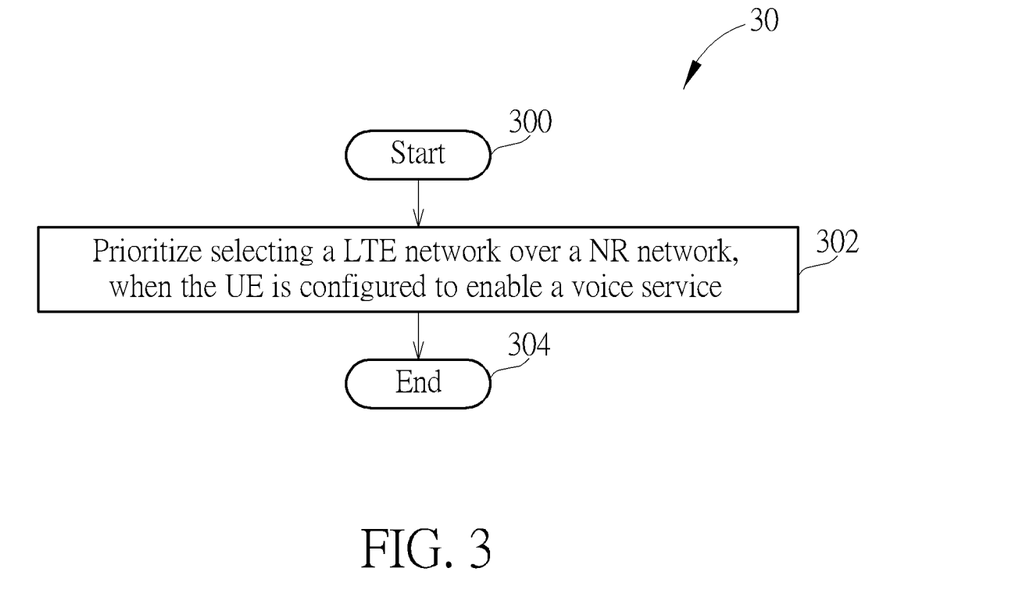
FIG. 3 is a flowchart of a process according to an example of the present invention.

A process 30 as shown in FIG. 3 may be utilized in a UE and includes the following steps:

Step 300: Start.

Step 302: Prioritize selecting a LTE network over a NR network, when the UE is configured to enable a voice service.

Step 304: End.

The following examples may be applied to the process 30.

In one example, the UE (e.g., determines to) registers to an EPC via a BS of the LTE network, when the UE camps on a cell of the BS. Thus, the UE may initiate the voice service in the LTE network.

In one example, the UE (e.g., determines to) registers to an EPC via a BS of the LTE network, when the UE receives system information (SI) indicating that the BS supports connecting to the EPC (e.g., mobility management entity (MME)) and a NGC (e.g., access and mobility management function (AMF)) from the BS.

In one example, the SI includes at least one SI block (SIB). The UE may determine that the BS is capable of connecting to the EPC and/or NGC according to (e.g., by using) the at least one SIB. In one example, the UE determines that the BS is capable of connecting to the EPC according to at least one first SIB of the SI. The UE may determine that the BS is capable of connecting to the NGC according to (e.g., by using) at least one second SIB of the SI. When the UE receives the first SIB and the second SIB and the UE is configured to enable the voice service (e.g., the UE's usage setting is voice centric), the UE may determine to register to the EPC instead of the NGC. In one example, the UE determines that the BS is capable of connecting to the EPC and/or NGC according to (e.g., by using) a (same) SIB of the SI. When the UE receives the SIB and the UE is configured to enable the voice service, the UE may determine to register to the EPC instead of the NGC.

In one example, the UE (e.g., determines to) registers to the EPC when the UE is configured to enable the voice service (e.g., the voice service is preferred, or the UE's usage setting is voice centric). In one example, the UE (e.g., determines to) registers to the NGC when the UE is configured to enable a data service (e.g., the data service is preferred, or the UE's usage setting is data centric). That is, the UE prefers connecting to the NGC more than the EPC, to obtain the data service.

In one example, the UE prioritizes selecting the LTE network over the NR network, e.g., when the UE is configured that the voice service is preferred. That is, the UE prioritizes searching the LTE network over the NR network. In one example, the UE searches the LTE network via at least one LTE carrier frequency (e.g., first). Then, the UE searches the NR network via at least one NR carrier frequency or searches the UMTS network via at least one UMTS carrier frequency, when the UE does not find the LTE network. In one example, the UE searches the UMTS network via at least one UMTS carrier frequency (e.g., first). Then, the UE searches the NR network via at least one NR carrier frequency, when the UE does not find the UMTS network. In one example, the UE searches the NR network via at least one NR carrier frequency (e.g., first). Then, the UE searches the UMTS network via at least one UMTS carrier frequency, when the UE does not find the NR network.

In one example, the UE prioritizes selecting the NR network over the LTE network, when the UE is configured that the data service is preferred. In one example, the UE initiates the data service in the NR network to obtain a higher data rate. Thus, the UE may search the NR network via at least one NR carrier frequency (e.g., first). Then, the UE may search the LTE network via at least one LTE carrier frequency, when the UE does not find the NR network (e.g., during searching the at least one NR carrier frequency).

In one example, the voice service includes a circuit-switched (CS) voice call, an internet protocol (IP) multimedia subsystem (IMS) voice call or an emergency call. In one example, the UE establishes a RRC connection to the BS and transmits a non-access stratum (NAS) message (e.g., an extended service request) to the EPC via the RRC connection, when the UE initiates the CS voice call. The EPC requests/indicates the BS to hand over or redirect the UE to a second generation (2G) coverage or a third generation (3G) coverage. Then, the UE initiates the CS voice call via a 2G cell or a 3G cell. In one example, the UE establishes a data radio bearer (DRB) (e.g., configured by the BS) and transmits a session initiation protocol (SIP) message via the DRB to an IMS server via the BS/EPC (e.g., serving gateway), when the UE initiates the IMS voice call.

In one example, registering to the EPC via the BS includes that the UE establishes a RRC connection to the BS and transmits an attach request message or a tracking area update request message to the EPC via the RRC connection. Correspondingly, the UE receives an attach accept message or a tracking area update accept message from the EPC.

Figure 4:
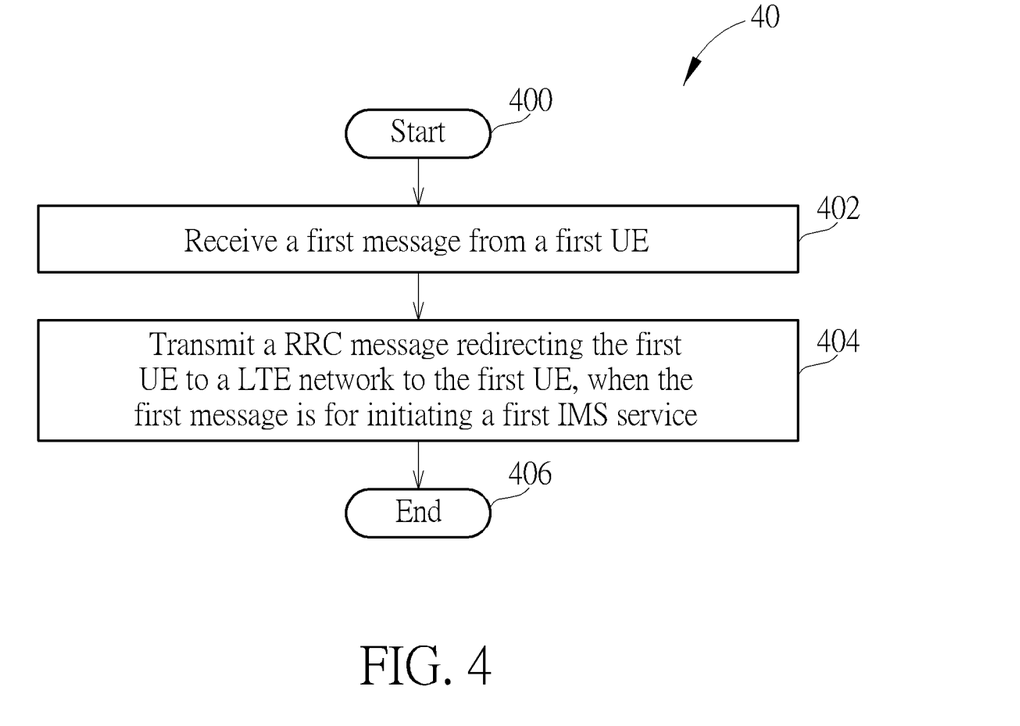
FIG. 4 is a flowchart of a process according to an example of the present invention.

A process 40 may be utilized in a NR network (e.g., of the network shown in FIG. 1) and includes the following steps:

Step 400: Start.

Step 402: Receive a first message from a first UE.

Step 404: Transmit a RRC message redirecting the first UE to a LTE network to the first UE, when the first message is for initiating a first IMS service.

Step 406: End.

Figure 5:
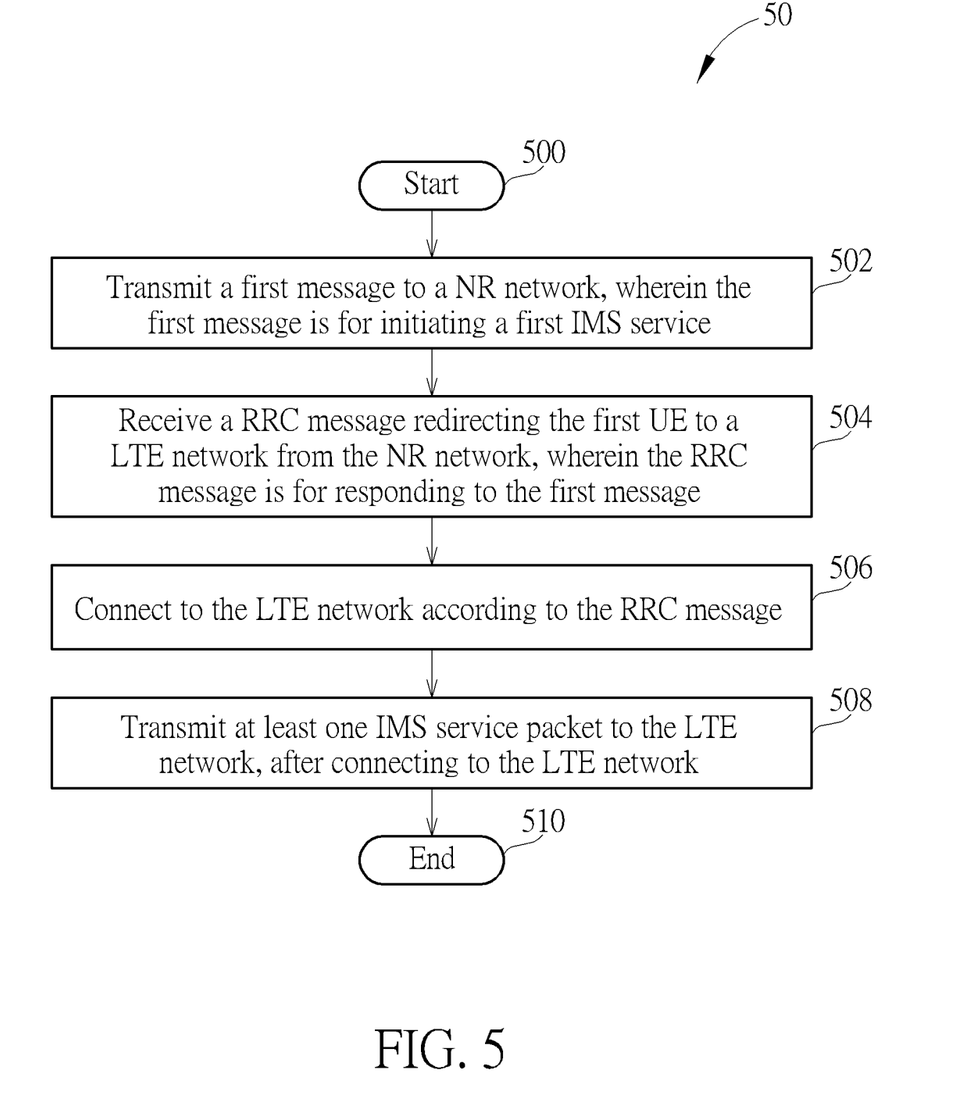
FIG. 5 is a flowchart of a process according to an example of the present invention.

A process 50 as shown in FIG. 5 may be utilized in a first UE and includes the following steps:

Step 500: Start.

Step 502: Transmit a first message to a NR network, wherein the first message is for initiating a first IMS service.

Step 504: Receive a RRC message redirecting the first UE to a LTE network from the NR network, wherein the RRC message is for responding to the first message.

Step 506: Connect to the LTE network according to the RRC message.

Step 508: Transmit at least one IMS service packet to the LTE network, after connecting to the LTE network.

Step 510: End.

The following examples may be applied to the processes 40-50.

In one example, the NR network does not (e.g., determines not to, or is configured not to) transmit the RRC message to the first UE, when the first message is not for initiating the first IMS service. That is, the NR network determines not to redirect (or hand over) the first UE to the LTE network in response to the first message. Accordingly, the first UE performs data (e.g., NAS messages, IP packets) transmission/reception with a NGC via (e.g., a BS of) the NR network.

In one example, the NR network receives a second message from the first UE or a second UE. Then, the NR network does not (e.g., determine not to, or is configured not to) transmit the RRC message (for redirecting the first UE to the LTE network) to the first UE or the second UE when the second message is for initiating (e.g., requesting) a second IMS service. That is, the NR network determines not to redirect (or hand over) the first UE or the second UE to the LTE network in response to the second message. Accordingly, the first UE or the second UE initiates (e.g., performs or completes) the second IMS service with a NGC via (e.g., a BS of) the NR network. According to the above description, whether the NR network transmits the RRC message or not is determined according to which one of IMS services (the first IMS service and the second IMS service) is being established.

"a UE" or "the UE" in the following examples may represent any UE described above, unless else described.

In one example, the NR network (e.g., BS, AMF, Session Management Function (SMF) or User Plan Function (UPF)) transmits the RRC message redirecting a UE for the first IMS service according to a network interface message received from a network (e.g., AMF/SMF/UPF/Policy Control Function (PCF)/Policy and Charging Rules Function (PCRF)/IMS core). The network interface message may indicate (triggers or requires) the NR network to redirect the UE to the LTE network for the first IMS service. The NR network may not transmit the RRC message, when the NR network does not receive the network interface message, or when the network interface message does not indicate (trigger or require) the NR network to redirect the UE to the LTE network for the first IMS service. In this case, the network determines to redirect the UE to the LTE network for the first IMS service, and determines not to redirect the UE to the LTE network for the second IMS service.

In one example, the NR network does not transmit the RRC message and configures a DRB (associated to a protocol data unit (PDU) session) to the UE, if the NR network detects/determines not able to redirect the UE to the LTE network (e.g., the UE is not in a coverage of the LTE network). The NR network may exchange at least one first IMS service packet with the UE via the DRB. The NR network may configure a SRB to the UE.

In one example, the UE transmits a second message to the NR network, wherein the second message is for initiating a second IMS service. In one example, the UE does not receive the RRC message (for redirecting the UE to the LTE network from the NR network) from the NR network. Accordingly, the UE initiates (e.g., performs or completes) the second IMS service with a NGC via (e.g., a BS of) the NR network. The NR network may configure a DRB to the UE and the UE may transmit/receive IMS packets of the second IMS service to/from the NR network via the DRB.

In one example, the first IMS service comprises an IMS emergency call, an IMS voice call or an IMS video call. In one example, the first IMS service is indicated in a first establishment cause of the first message.

In one example, the second IMS service comprises an IMS short message service or an IMS supplementary service. In one example, the second IMS service is indicated in a second establishment cause of the second message.

In one example, the first message comprises a first NR RRC message, a first NR NAS message or a first IMS message. The first NR RRC message may belong to a RRC connection establishment procedure (used to establish a RRC connection or a SRB), a RRC connection resume procedure (used to resume a RRC connection, a SRB or a DRB). For example, the first NR RRC message is a RRC request message, a RRC connection request message, a RRC resume request message, a RRC connection resume request message, a RRC configuration request message, a RRC connection setup complete message, a RRC setup complete message, a RRC connection complete message, a RRC configuration setup complete message, a RRC resume complete message or a RRC connection resume complete message. For example, the first NR NAS message is a service request message or a PDU session establishment request message. For example, the first IMS message is a SIP message (e.g., INVITE message). The UE may receive a SIP response message (e.g., 100 Trying, 183 Session Progress, 200 OK) for responding to the SIP message from the NR network, when the NR network transmits the RRC message redirecting the UE after transmitting the SIP response message. The UE may receive a SIP response message (e.g., 100 Trying, 183 Session Progress, 200 OK) for responding to the SIP message from the LTE network, when the NR network transmits the RRC message redirecting the UE before transmitting the SIP response message. That is, the LTE network transmits the SIP response message to the UE, when the LTE network connects to the UE.

In one example, the second message comprises a second NR RRC message, a second NR NAS message or a second IMS message. Examples of the second NR message are as examples of the first NR message above. For example, the second NR NAS message is a service request message or a PDU session establishment request message. For example, the second IMS message is a SIP message (e.g., MESSAGE message). The first message and the second message may be different messages. The first message and the second message may comprise an information element (IE) with a different value. The IE (e.g., cause value) may indicate the first/second IMS service. The UE may receive a SIP response message for responding to the SIP message via the NR network.

In one example, the RRC message comprises a NR RRCConnectionReject message or a NR RRCConnectionRelease message. In one example, the RRC message comprises a NR handover command handing over the UE from the NR network to another radio access technology (RAT) (e.g., the LTE network). In one example, the NR handover command comprises a first LTE RRCConnectionReconfiguration message for configuring a LTE cell of the LTE network. When the UE receives the RRC message, the UE stops communicating with the NR network and starts accessing the LTE network.

For example, the UE enters a NR RRC_IDLE state or a NR RRC_INACTIVE state from a NR RRC_CONNECTED state or a NR RRC_INACTIVE state and selects a LTE cell of the LTE network according to the RRCConnectionRelease message. Then, the UE (if in the NR RRC_IDLE state) performs a LTE RRC connection establishment procedure via the LTE cell to establish a LTE RRC connection with the LTE network. The UE (if in the NR RRC_INACTIVE state) performs a LTE RRC connection resume procedure via the LTE cell to establish a LTE RRC connection with the LTE network. The RRCConnectionRelease message may or may not comprise an absolute radio frequency channel number (ARFCN) identifying a carrier frequency of the LTE cell and/or comprise a physical cell identity of the LTE cell. The UE may transmit a LTE NAS service request message to the LTE network via the LTE RRC connection. The LTE network may configure two evolved packet system (EPS) bearers and two DRBs to the UE via the LTE RRC connection. The UE may exchange SIP messages via one of the two DRBs and the first IMS service packets via the other of the two DRBs with the LTE network.

For example, the UE may connect to the LTE cell and may establish a LTE RRC connection (comprising at least one SRB, e.g., SRB1 and/or SRB2) according to the first LTE RRCConnectionReconfiguration message. The UE may transmit a handover complete message (e.g., a first LTE RRCConnectionReconfigurationComplete message) via the LTE RRC connection (e.g., SRB1) via the LTE cell to the LTE network (e.g., an eNB).

In one example, the LTE network configures a first EPS bearer and a first DRB to the UE in the first LTE RRCConnectionReconfiguration message. Then, the LTE network may configure a second EPS bearer and a second DRB to the UE in a second LTE RRCConnectionReconfiguration message via the LTE RRC connection.

In one example, the LTE network does not configure any EPS bearer and DRB in the first LTE RRCConnectionReconfiguration message or configures a third EPS bearer and a third DRB in the first LTE RRCConnectionReconfiguration message. The LTE network may configure the first and second EPS bearers, and the first and second DRBs to the UE in the second LTE RRCConnectionReconfiguration message.

In one example, the LTE network configures the first and second EPS bearers, and the first and second DRBs to the UE in the first LTE RRCConnectionReconfiguration message.

In one example, the UE exchanges SIP messages via the first DRB and the first IMS service packets via the second DRB with the LTE network.

In one example, the UE performs a NR (or 5GS) registration procedure with the NR network, before transmitting the first message to the NR network. The UE may establish a PDU session with the NR network according to (e.g., by using) a PDU session establishment procedure. The UE may transit a first SIP message (e.g., register message) via a DRB associated to the PDU session via the NR network to perform an IMS registration. The UE may receive a first SIP response message (e.g., 200 OK message) for responding to the first SIP message via the DRB. After/when the UE completes the IMS registration, the UE may transmit the first message/the second message described in the description of processes 40-50.

In one example, the UE transmits the first/second message in response to/when initiating the first/second IMS service.

In one example, the UE performs a tracking area update procedure with the LTE network, when connecting to the LTE network. The UE may perform the tracking area update procedure by transmitting a tracking area update request message to the LTE network via the LTE RRC connection. The UE may receive a tracking area update accept message responding the tracking area update request message from the LTE network via the LTE RRC connection.

In one example, the NR network includes a gNB and a NGC, and the LTE network includes an eNB and an EPC. The NGC may include an AMF, an SMF and a UPF. The EPC may include a MME and a serving gateway.

The RRCConnectionRelease message may or may not comprise a release cause value indicating redirection for the first IMS service. According to the RRCConnectionRelease message, the UE may or may not release the RRC connection (e.g., including at least one SRB, e.g., SRB1 and/or SRB2) and the DRB associated to the PDU Session, which are configured by the NR network (e.g., the gNB).

When the UE completes the first IMS service, the LTE network may transmit a LTE RRCConnectionRelease message to the UE. In one example, the LTE RRCConnectionRelease message redirects the UE to the NR network. In one example, the UE starts searching the NR network (e.g., via a NR frequency), when receiving the LTE RRCConnectionRelease message.

The LTE network, the NR network, the EPC and the NGC may provide packet switched (PS) services since they are PS systems. However, the NGC may not support the voice service or the emergency call, while the EPC may support the voice service. According to the processes 30, 40 and 50, the UE can obtain the voice service.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the above processes and examples above may be compiled into the program codes 214.

To sum up, the present invention provides a method and related communication device for handling a connection. Thus, the UE knows which one of the LTE network and the NR network is to be connected. As a result, the problem of the connection is solved.

What is claimed is:

1. A new radio (NR) network of handling a connection, comprising:
    a storage device; and
    a processing circuit, coupled to the storage device, wherein the storage device stores instructions, and the processing circuit is configured to execute the instructions of:
    receiving from a first communication device a first message for initiating a first internet protocol (IP) multimedia subsystem (IMS) service;
    transmitting a radio resource control (RRC) message, redirecting the first communication device to a long term evolution (LTE) network and causing the first communication device to enter a NR RRC_IDLE state or a NR RRC_INACTIVE state from a NR RRC_CONNECTED state, to the first communication device, after receiving the first message; and
    configuring a data radio bearer (DRB) to the first communication device, when the NR network detecting not able to redirect the first communication device to the LTE network;
    wherein the RRC message comprises a NR RRCConnectionRelease message.

2. The NR network of claim 1, wherein the instructions further comprise:
    not transmitting the RRC message to the first communication device, when the first message is not for initiating the first IMS service.

3. The NR network of claim 1, wherein the instructions further comprise:
    receiving a second message from the first communication device or a second communication device; and
    not transmitting the RRC message to the first communication device when the second message is for initiating a second IMS service, wherein the second IMS service comprises an IMS short message service or an IMS supplementary service.

4. The NR network of claim 3, wherein the second message comprises a second NR RRC message, a second NR Non Access Stratum (NAS) message or a second IMS message.

5. The NR network of claim 1, wherein the first message comprises a first NR RRC message, a first NR NAS message or a first IMS message.

6. The NR network of claim 1, wherein the instructions further comprise:
   receiving a network interface message from a NR network node; and
   transmitting the RRC message in response to the network interface message.

7. The NR network of claim 6, wherein the NR network node is an Access and Mobility Management Function (AMF), a Session Management Function (SMF) or a User Plane Function (UPF).

8. A method for a new radio (NR) network base station (BS), comprising:
   receiving from a first communication device a first message for initiating a first internet protocol (IP) multimedia subsystem (IMS) service;
   transmitting a radio resource control (RRC) message, redirecting the first communication device to a long term evolution (LTE) network and causing the first communication device to enter a NR RRC_IDLE state or a NR RRC_INACTIVE state from a NR RRC_CONNECTED state, to the first communication device, after receiving the first message; and
   configuring a data radio bearer (DRB) to the first communication device, when the NR network BS detecting not able to redirect the first communication device to the LTE network;
   wherein the RRC message comprises a NR RRCConnectionRelease message.

9. The method of claim 8, further comprising:
   not transmitting the RRC message to the first communication device, when the first message is not for initiating the first IMS service.

10. The method of claim 8, further comprising:
    receiving a second message from the first communication device or a second communication device; and
    not transmitting the RRC message to the first communication device when the second message is for initiating a second IMS service, wherein the second IMS service comprises an IMS short message service or an IMS supplementary service.

11. The method of claim 10, wherein the second message comprises a second NR RRC message, a second NR Non Access Stratum (NAS) message or a second IMS message.

12. The method of claim 8, wherein the first message comprises a first NR RRC message, a first NR NAS message or a first IMS message.

13. The method of claim 8, further comprising:
    receiving a network interface message from a NR network node; and
    transmitting the RRC message in response to the network interface message.

14. The NR network of claim 13, wherein the NR network node is an Access and Mobility Management Function (AMF), a Session Management Function (SMF) or a User Plane Function (UPF).

* * * * *